United States Patent Office 2,843,456
Patented July 15, 1958

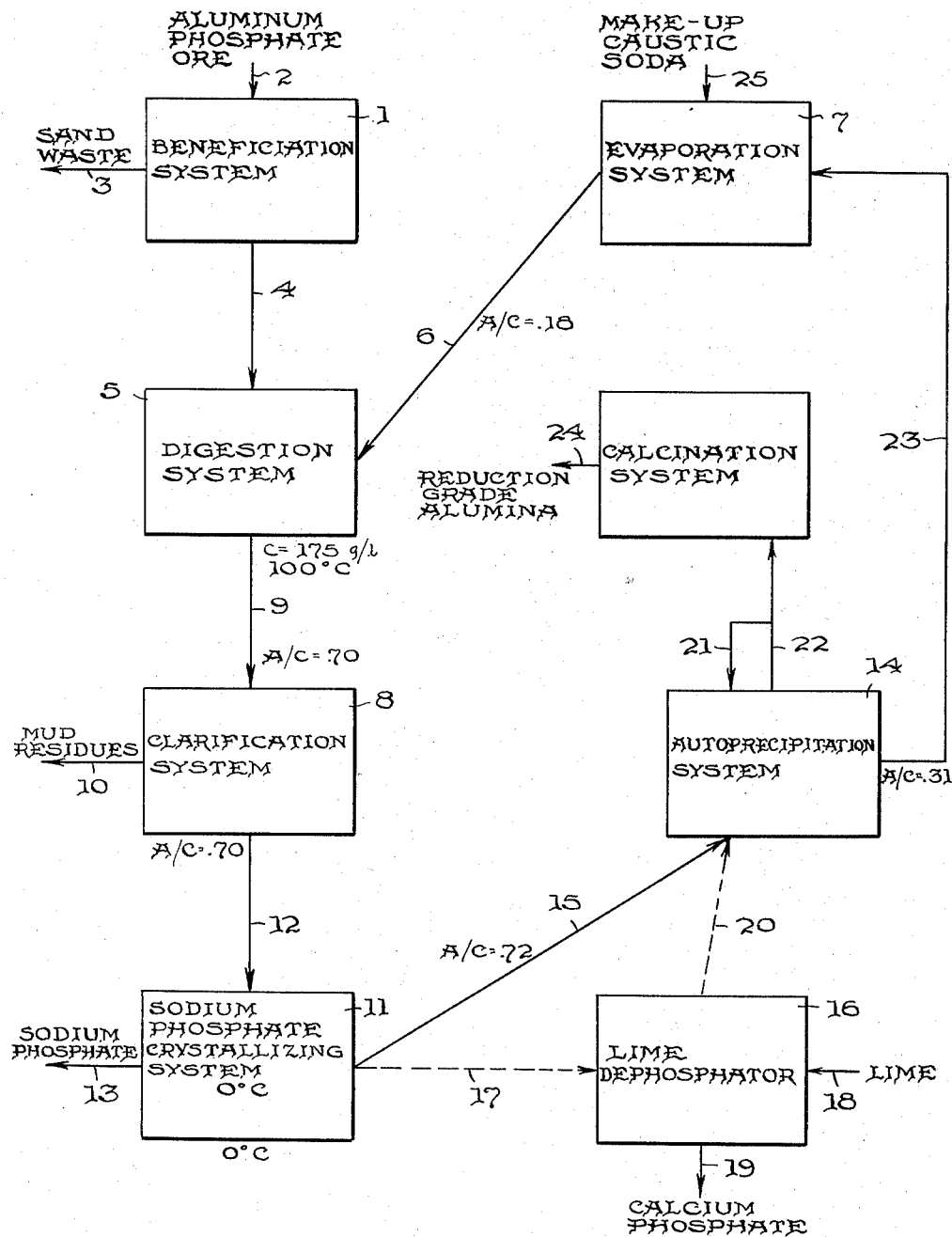

2,843,456

PROCESS FOR TREATING ALUMINOUS ORES

John L. Porter, Baton Rouge, La., assignor to Kaiser Aluminum & Chemical Corporation, Oakland, Calif., a corporation of Delaware Application April 27, 1953, Serial No. 351,438

9 Claims. (Cl. 23—143)

The herein described invention relates to a method for treating aluminum phosphate containing ores. More particularly, the invention relates to a method for solubilizing the alumina and phosphate values from aluminous phosphatic ores containing minerals such as wavellite or crandallite.

Heretofore, the principal source of alumina and alumina hydrate has been the hydrated alumina containing bauxites processed according to the conventional alkaline Bayer practice. With the increasing demand for aluminum and the decreasing supplies of high grade bauxites, such as those of the Surinam or high alumina trihydrate containing types which are especially amenable to alkaline type processes, consideration of other alumina containing ores has become more widespread. The aluminum phosphate containing ores, as for example, the wavellite and pseudo-wavellites (crandallite) from the Florida pebble phosphate area, provide a potential source of large amounts of alumina as well as phosphates.

Essentially the alkaline Bayer process as practiced with the hydrated aluminous ores comprises a caustic digest of the bauxite under pressure in so-called "spent liquor" to solubilize the alumina values, followed by clarification of the insoluble residue from the green aluminate liquor, whereafter they are subjected to conventional autoprecipitation practice for recovery of the alumina content as insoluble alumina trihydrate. This may thereafter be calcined for the production of a reduction grade alumina ore for use in the electrolytic process for producing aluminum. The Bayer process is based on the principle of different solubilities of alumina in caustic solutions at varying conditions of temperature and caustic soda concentration, the former being the most influencing factor as regards the solubility in the commercial ranges of caustic soda concentrations employed in Bayer practice. However, the required operating conditions during the residue clarification step necessarily limit the amount of alumina which may be solubilized during digestion per unit of liquor employed under the most ideal trihydrate type of Bayer extraction system wherein the highest solubilities of alumina are obtained. For example, after digesting at elevated temperatures under pressure the liquor containing slurry is flashed in plant practice to atmospheric pressure whereat the clarification operation is carried out. This cooling, through flashing of the liquors, necessarily presents a different set of temperature and caustic soda conditions than present during the digestion phase. Consequently, the equilibrium solubility of the solution with respect to alumina is decreased, thereby providing a caustic aluminate solution which is supersaturated with respect to the equilibrium solubility of alumina at the conditions prevailing during clarification. However, so long as the amount of bauxite charged to the digestion phase does not provide for an alumina to caustic soda ratio much in excess of the equilibrium solubility ratio corresponding to about 25° C. higher than the temperature to which the solution is cooled for clarification, crystallization of the alumina trihydrate from the solution does not take place to any appreciable extent. However, where the amount of bauxite charged to the digesters provides for concentrations greater than those defining this so-called meta stable range above the true equilibrium solubility for the conditions prevailing during clarification autoprecipitation takes place with the resulting loss of otherwise recoverable alumina with the residues removed from the green liquors. It is readily apparent therefore, that the alkaline extraction of alumina from hydrated aluminous bauxites is limited as regards the unit production of alumina per unit of liquor due to the maximum concentrations of alumina which may be tolerated in the caustic liquors during clarification without excessive losses occurring.

In Bayer practice the amount of alumina in solution is normally expressed as the ratio of the alumina to caustic soda (A/C) by weight and will be referred to herein on this basis. The alumina is reported as $Al_2O_3$, whereas the caustic soda (C) representing the soda as sodium aluminate and free sodium hydroxide is reported as the equivalent $Na_2CO_3$. The total soda (T. S.) represents the sum of the caustic soda and sodium carbonate present in the liquors and is likewise reported as the equivalent sodium carbonate.

Furthermore, in processing hydrated alumina containing bauxites, the alumina to caustic soda ratio that may be obtained according to a particular set of digesting conditions depends upon the type of hydrated aluminous bauxite being subjected to the alkaline process. Thus, it is highly desirable to have available for processing, a bauxite which contains aluminous values substantially as trihydrate alumina because of the more easily extractable nature of this type of bauxite. Thus, for any given caustic soda concentration and extraction temperature, there is attainable a given A/C ratio, depending on the type of hydrated ore being processed, representing the equilibrium solubility for the particular conditions. For practical purposes because of the danger of exceeding the alumina concentration or A/C ratio covering the range of meta stable conditions, present during clarification, the highest charging ratios attained in plant practices are found in trihydrate extraction processes and are about an A/C ratio of .62. When processing boehmite ores, which are predominantly alumina monohydrate containing bauxites, the A/C ratio obtainable on the other hand during plant extraction is appreciably less than that obtained from the alkaline extraction of gibbsite or trihydrate aluminous ores under the same caustic soda and temperature conditions. For example, in European practice where boehmite ores are subjected to the Bayer process, caustic soda concentrations of about 425 grams per liter and temperataures of 200° C. are employed for producing A/C ratios of only about .58. On the other hand, in American practice with gibbsite ores the higher A/C ratios of about .62 are easily obtained under temperature conditions of about 145° C. at caustic soda concentration around 170 grams per liter. Higher A/C ratios are not achieved without exceeding the A/C ratios representing the allowable degree of super-saturation to keep within the range of meta stability of the solution during the clarification step. The meta stable ranges, of course, vary with the concentration of the solution and other conditions present during clarification. The lower temperatures and caustic soda conditions in American practice obviously align themselves, however, with less costly processing conditions as compared to European practice with monohydrate alumina containing ores. In fact, lower temperatures can be employed in American trihydrate practice with the attainment of the high A/C ratios associated therewith, but to promote desilication temperatures around 145° C. are preferred.

Concerning alkaline processes employed with ores containing aluminum phosphates, it is well known in the art that the aluminum and phosphate values may be solubilized in caustic liquors by either boiling or digesting therein under pressure. Furthermore, it is also well known that the phosphate content solubilized together with the alumina values, as by digesting, may be selectively recovered from the extracting liquors through cooling thereof, causing insoluble trisodium phosphate to crystallize out and leaving the aluminates in solution. It is also recognized in the art that the addition of sodium phosphate to supersaturated caustic aluminate liquors promotes the stabilization of the liquors and prevents the precipitation or crystallization of the hydrated alumina.

Nevertheless, the importance of these previous findings as applied to commercial operations which are concerned with alkaline processing of wavellite and pseudowavellite types of ores for the recovery of the alumina content has been overlooked and not fully recognized. Thus, although the prior art recognizes that aluminum phosphate ores may be solubilized in caustic liquors, the amount of alumina solubilized from the ores has been no greater than the alumina solubilities corresponding to conventional trihydrate Bayer practice and, in general, only alumina to caustic soda ratios have been obtained which correspond more to the monohydrate Bayer practice. Moreover, because of the siliceous nature of the ores of aluminum phosphate which cause soda and alumina losses through the formation of insoluble products the alkaline processes have been discouraged. Consequently, the alkaline processing of the aluminous phosphatic ores has not become commercially significant as competitive with the Bayer process as practiced on the hydrated aluminous bauxites.

It has been discovered according to the invention that A/C ratios greater than those found in present Bayer practice can be attained when processing aluinum phosphatic ores such as those found in Florida as the overburden in the bone phosphate fields and, that the solubilities are not limited by the maximum meta stable conditions found in commercial Bayer plant clarification systems. Thus, by combining the stabilizing effect of sodium phosphate, produced as a result of the solubilizing reaction, on caustic aluminate liquors with the high degrees of alumina solubilities which heretofore have not been recognized as attainable during commercial alkaline processing of aluminous phosphatic ores, the solubility limitations of the Bayer process as practiced on hydrated aluminous bauxite are overcome. Still further, these higher degrees of alumina solubilities may be realized under processing conditions with respect to caustic soda concentrations and temperatures considerably less drastic than found in ordinary Bayer practice. Moreover, an alkaline extraction process has been devised which may be employed with aluminous phosphatic ores containing appreciable amounts of silicous material without excessive losses of otherwise recoverable alumina and soda resulting.

It is readily apparent that attainment of higher alumina to caustic soda ratios than heretofore found commercially in Bayer plant practice will increase the amount of alumina hydrate recoverable per unit of caustic soda utilized for the extraction of the valuable constituents from the ores. This in itself is an important feature of the invention in that conventional practice on bauxites permits recovery of only about 50% of the contained alumina in the pregnant liquors during autoprecipitation. With the higher alumina solubilities possible through practice of the herein described invention the amount of alumina recovered during autoprecipitation increases directly with the content of alumina in the pregnant liquors since the limitations as regards hydrate recovery from caustic aluminate solutions by autoprecipitation are the finishing ratios or final A/C ratio after autoprecipitation.

Still further advantages over present Bayer practice on bauxites lie in the fact that trisodium phosphate may be recoverable as a by-product to the Bayer process when practiced on aluminum phosphates containing ores where dephosphating is carried out according to one of the alternative well known methods of dephosphating the caustic aluminate liquors such as by cooling.

Still another advantage of the herein described process is that a greater amount of alumina hydrate product results from subjecting liquors of higher A/C ratios to autoprecipitation, thus decreasing the amount of time required during autoprecipitation per unit recovery of hydrate.

Accordingly, it is a primary object of the invention to provide an alkaline extraction process for utilization with aluminum phosphate ores and specifically the wavellite and pseudowavellite types of ores found in Florida.

It is a further object to provide an alkaline extraction process which enables solubilities of alumina in caustic liquors to be obtained greater than heretofore experienced in Bayer plant practice because of the limits of alumina solubility allowable in clarification operations.

It is a further object of the invention to provide an alkaline process for the extraction of alumina and phosphate values from aluminum phosphatic ores and for the independent recovery of said values.

It is still another object to provide a method for digesting silica containing aluminum phosphate ores in alkaline solutions for the recovery of the alumina and phosphate value therein so as to minimize the loss of alumina and soda through reaction with said silica content.

In general, it has been found that the exceptionally high alumina to caustic soda ratios may be obtained by solubilizing alumina containing phosphatic ores in caustice solutions over a wide range of conditions with respect to caustic soda concentrations, temperatures and digestion time. (Digestion as herein used refers to solubilization at atmospheric as well as under pressure conditions.)

As a specific example of the high degrees of aluminate solubility which may be obtained under different conditions the following experiments were performed.

EXAMPLE NO. 1

To 100 ml. of an artificial Bayer spent liquor of the following analysis:

| | |
|---|---:|
| $Al_2O_3$ (grams/liter) | 80.32 |
| C (grams/liter) | 301.7 |
| T. S. (grams/liter) | 373 |

23.28 grams of an aluminum phosphate ore of the following analysis after beneficiation was charged:

| | |
|---|---:|
| Percent LOI (lost on ignition) | 15.25 |
| Percent $SiO_2$ | 14.18 |
| Percent CaO | 6.58 |
| Percent $Fe_2O_3$ | 4.05 |
| Percent $TiO_2$ | 1.08 |
| Percent $P_2O_5$ | 26.08 |
| Percent $Al_2O_3$ | 30.11 |
| Percent minor constituents | 2.67 |

The ore was digested at 150° C. for 60 minutes and the pregnant liquor thereafter analyzed. It was found that 98.17% of the estimated available $P_2O_5$ (which is the chemically analysed $P_2O_5$ in the ore corrected for .8 of the lime present in the ore) was solubilized and 85.65% of the chemically analysed $Al_2O_3$ was solubilized to give an alumina to caustic soda (A/C) ratio in the green liquor of .768. The caustic soda concentration of the green liquor was 183 grams/liter.

EXAMPLE NO. 2

In another experiment, utilizing an artificial Bayer spent liquor having the same analysis as that given in Example 1, an ore of the same analysis as also used in Example 1 was charged to the spent liquor in the proportions of 232.8 grams of ore per liter of spent liquor, and digested therein at 100° C. for 15 minutes. After analysing the green liquor removed therefrom, it was determined that 100.4% of the estimated available $P_2O_5$ content of the ore had been solubilized and that 90.10% of the chemically analysed $Al_2O_3$ had been solubilized to give a green liquor having a caustic soda (C) concentration of 195 grams per liter and an alumina to caustic soda ratio (A/C) of .736.

EXAMPLE NO. 3

As another specific example of the exceptionally high degrees of alumina solubilization obtainable 13.71 grams of a beneficiated aluminum phosphatic ore of the following analysis was charged to 100 ml. of an artificial spent liquor having an alumina concentration ($Al_2O_3$) of 56.38 grams per liter, a caustic soda concentration (C) of 197.1 grams per liter and a total soda (T. S.) concentration of 248.8 grams per liter:

| | |
|---|---|
| LOI | 22.91 |
| $SiO_2$ | 10.61 |
| CaO | .05 |
| $P_2O_5$ | 27.73 |
| $Fe_2O_3$ | 1.86 |
| $TiO_2$ | .96 |
| $Al_2O_3$ | 32.18 |
| Minor constituents | 3.70 |

The ore charged was digested in the simulated Bayer spent liquor at 100° C. for 15 minutes whereafter the green caustic aluminate liquor analysed a caustic soda (C) concentration of 113 grams per liter and had an alumina to caustic soda (A/C) ratio of .849. It was found that 90.88% of the chemically analyzed $Al_2O_3$ had been solubilized and 93.30% of the available $P_2O_5$ content of the ore. This ratio represents better than 30% greater concentration of alumina based on the normal A/C ratio of the pregnant liquor in a conventional trihydrate Bayer process and will enable better than 70% greater recovery of alumina during auto-precipitation, based on a .30 A/C finishing ratio, as compared to recoveries from trihydrate alumina extraction processes.

To minimize the amount of silica dissolved in the caustic liquors milder conditions than found in ordinary Bayer plant practice on hydrated aluminous ores are preferred. For example, it has been found that temperatures not greater than found under atmospheric pressure conditions such as from about 80° C. to the boiling point of the solution are preferred for the solubilization reaction in order to eliminate, as near as possible, the solubilization of the silicious components of the ores which, once solubilized, react with the caustic and alumina values to form insoluble sodium aluminum silicate complexes. Of course, the higher temperatures associated with conventional Bayer practice may be employed, such as for example 150° C., to obtain the high degrees of alumina solubility as shown above but this results in substantial amounts of silica being solubilized and subsequent caustic soda and alumina losses through formation of the insoluble products of desilication. Consequently, the amount of alumina which may be recovered by an alkaline process from the silica containing aluminous phosphatic ores decreases as higher temperatures are employed and greater amounts of silica are solubilized by the reaction with the caustic soda.

The utilization of these lower temperatures for digestion purposes are not to be confused with those advocating higher temperatures of around 150° C. in order to obtain a green alumina and phosphate containing liquor having a small amount of soluble silica therein. The purpose in such cases is to promote the desilication and formation of the complex sodium aluminum silicates after they are solubilized because the very temperatures employed adhere to substantial caustic attack on the silicious components of the ores and solubilization thereof. Contrary to these advocated procedures for obtaining a relatively silica free caustic aluminate phosphate containing liquor, the process according to one phase of the herein described invention for overcoming the silica problem is such as to solubilize the aluminum phosphate values prior to substantial solubilization of the silica, thereby avoiding the soda and alumina losses associated with these higher temperature practices. For minimizing the caustic attack on the silica in the ores the preferred temperature conditions during digestion are from about 80° C. to the atmospheric boiling point of the caustic solution. Thus, temperatures as low as 80° C. have been found to give amounts of alumina extracted comparable to those found when boiling temperatures are employed and with substantially less amounts of $SiO_2$ extracted and resulting alumina and soda losses as compared to the higher temperatures found in Bayer plant practice.

In line with digesting under atmospheric conditions to prevent appreciable solubilization of silica with the resultant soda and alumina losses, the use of short digesting periods is advocated according to another phase of the herein described invention. Thus, although the lower temperatures above referred to allow the high degrees of aluminate solubility to be obtained with less caustic attack on the silicious components of the aluminum phosphate ores and consequent losses of otherwise recoverable alumina and valuable soda, the advantage of maintaining high alumina recoveries from the ore by lessening the losses of alumina as insoluble desilication products is minimized by lengthy digestion periods wherein the caustic aluminate liquors remain in contact with the residue containing silicious components. In other words, although the lower temperatures do not, from a practical standpoint of view, affect the rate of solubilization of the aluminum phosphate, but rather do advantageously slow up the solubilization rate of the silicious material, prolonged digestion periods allow greater amounts of silica to become solubilized, which in turn, promote the loss of the valuable alumina and soda which would otherwise be recoverable. Consequently, shorter digestion periods are preferred in order to obtain the high A/C ratio liquors with a minimum loss of alumina and soda from reaction with solubilized silica. In general, of course, the high alumina concentrations in the caustic liquors may be obtained regardless of the length of the digestion period, although, for practical purposes digestion periods, wherein the silica containing ores are in contact with the caustic aluminate liquors under solubilization conditions, less than about 60 minutes are preferred. This is best brought out by the material presented in Table I.

According to the experiments carried out and reported in Table I an aluminum phosphatic ore from the Florida pebble phosphate area was beneficiated for the removal of a portion of the silica content and thereafter had the following analysis:

| | Percent |
|---|---|
| LOI | 16.45 |
| $SiO_2$ | 10.24 |
| $R_2O_3$ | 64.34 |
| CaO | 6.62 |
| $TiO_2$ | 1.32 |
| $Fe_2O_3$ | 2.97 |
| $P_2O_5$ | 27.62 |
| $Al_2O_3$ | 32.42 |

Four samples of ore were digested at 100° C. after each was charged with 15.94 grams of ore per 100 ml. of an artificial Bayer spent liquor of the following analysis:

| | Grams/liter |
|---|---|
| $Al_2O_3$ | 57.56 |
| Caustic soda | 224.88 |
| Total soda | 256.7 |

The 4 samples were thereafter digested for different periods of time, filtered and analysed.

Table I

| Digestion Time (Minutes) | 10 | 20 | 30 | 60 |
|---|---|---|---|---|
| Percent Available $P_2O_5$ Solubilized | 96.61 | 96.86 | 96.69 | 96.55 |
| Percent Chemical $Al_2O_3$ Solubilized | 85.63 | 84.32 | 86.33 | 86.17 |
| Green Clarified Liquor: | | | | |
|   Caustic Soda (grams/liter) | 144 | 143 | 143 | 142.5 |
|   Soda with $P_2O_5$ (grams/liter) | 77 | 77 | 77 | 77 |
|   Percent Caustic Soda Lost | 1.45 | 1.83 | 2.02 | 2.32 |
|   $SiO_2$ (grams/liter) | 1.0 | 1.57 | 1.91 | 2.22 |
|   A/C | .706 | .707 | .716 | .718 |

It is apparent from a consideration of the material presented that the amount of $P_2O_5$ and $Al_2O_3$ in each case was approximately the same thus showing that the length of digest is not an appreciable factor as regards the extraction of either component from the ores. Thus, in each case about 96 to 97% of the available $P_2O_5$ was extracted whereas around 85% of the chemical $Al_2O_3$ was also extracted from the ore.

Indicative of the loss of alumina and soda values through formation of insoluble sodium aluminum silicate complexes is the percent of the caustic soda which was lost or unaccounted for in the green clarified liquor. It is readily apparent that with increased digestion times there is an increase in the amount of caustic soda lost. Thus, 1.45% of the caustic soda was lost for a 10 minute digest and the loss progressively increased with the 20, 30, and 60 minute digests to the point where 2.32% of the caustic soda was lost for the longest digestion period. Since the loss of $Al_2O_3$ therewith as the sodium aluminum silicate complex is about one mol of $Al_2O_3$ per two mols of $SiO_2$, it becomes apparent that considerable amounts of alumina are also lost. It is also to be noted that the amount of $SiO_2$ remaining in solution with the green liquor increased as the digestion periods increased, thus indicating a greater scaling problem in subsequent phases of the operation with longer digestion periods.

It is thus apparent from the foregoing that the aluminous and phosphate values may be solubilized under comparatively short periods during which the ores are in contact under digestion conditions with the extracting caustic liquors and that the losses of alumina and soda increase as the length of time of contact with the silicious components of the ores increases. This discovery naturally gives rise to several types of operations whereby the solubilizing reaction may be carried out and especially so in view of the fact that digestion as well as clarification may be under atmospheric conditions. For example, the aluminum phosphate values may be solubilized by boiling in a caustic solution for periods less than about 1 hour and clarified immediately so as to prevent further solubilization of silica.

Another method of operation is to digest in caustic liquors at a temperature of from 80° C. to the atmospheric boiling point for not greater than about 30 minutes and immediately cool the slurry, as by vacuum flashing, to less than about 70° C. whereat the rate of solubilization of the silicious components is appreciably less and thereafter clarify the slurry of the insoluble residues by a conventional settling operation. In general, in such a case, cooling to from 60° C. to 70° C. has been found satisfactory as substantially decreasing the rate of silica solubilization and affording satisfactory operations for overcoming subsequent solubilization of substantial amounts of $SiO_2$.

Still another method of operation would be to permit the solubilization reaction to be carried simultaneous to clarification by decantation. Thus, the ore and spent liquor may be mixed under digesting conditions and then led to a mud settler wherein the digesting conditions as regards temperature conditions are maintained during the remainder of the digestion period.

It is apparent from the foregoing that the solubilization reaction may be carried out under a wide variety of operating conditions depending on the losses of alumina and soda which may be suffered as a result of the length of time required by the particular operation employed in which conditions of silica solubilization are maintained. However, the object in each situation is to maintain the ore in contact with the liquors under extracting conditions for a period of time sufficient to solubilize substantially all of the aluminum phosphate, yet for period of time insufficient to solubilize substantial quantities of silicious material. This particular period of contact, of course, must be determined empirically from the type of ore being processed, the particular operating conditions as regards clarification and solubilization and product recovery.

It has also been determined that the lower caustic soda concentrations for digestion tend to decrease the amount of silica solubilized in the caustic liquors. This is brought out by the material in Table II, wherein a beneficiated aluminum phosphatic ore of the following analysis was employed in the extraction tests:

| | Percent |
|---|---|
| LOI | 10.59 |
| $SiO_2$ | 41.60 |
| $R_2O_3$ | 41.56 |
| CaO | 4.26 |
| $Fe_2O_3$ | 2.63 |
| $TiO_2$ | .69 |
| $P_2O_5$ | 17.96 |
| $Al_2O_3$ | 20.28 |

For the concentrated conditions 100 mls. of spent liquor of indicated analysis was charged with 21.62 grams of ore. Likewise, in the dilute test 100 mls. of spent liquor was charged with 6.18 grams of ore. The digestion time and temperature for extraction in both cases were 15 minutes and 100° C. respectively.

Table II

| | Conc. | Dilute |
|---|---|---|
| Digestion: | | |
|   Spent Liquor Caustic Soda Conc. (g./l.) | 301.7 | 100 |
|   Spent Liquor $Al_2O_3$ Conc. (g./l.) | 80.32 | 26.62 |
|   Spent Liquor Total Soda Conc. (g./l.) | 373 | 123.6 |
|   Digestion Time (Minutes) | 15 | 15 |
|   Digestion Temperature (° C.) | 100 | 100 |
| Green Liquor: | | |
|   Caustic Soda Conc. (g./l.) | 190 | 67 |
|   $SiO_2$ (g./l.) | 1.95 | 0.31 |
|   $Al_2O_3$ (g./l.) | 141.8 | 44.5 |
|   $P_2O_5$ (g./l.) | 46.3 | 13.1 |
|   A/C | .745 | .667 |
| Constituents Solubilized: | | |
|   Percent Available $P_2O_5$ | 95.98 | 95.14 |
|   Percent Chem. $Al_2O_3$ | 87.72 | 89.41 |

It is apparent from a consideration of the constituents solubilized for the two conditions that approximately the same percent of $P_2O_5$ and $Al_2O_3$ were solubilized in both cases. Of considerable importance is the results of a comparison of the $SiO_2$ content in the green liquor for the concentrated and dilute extracting conditions. Thus, under the concentrated extracting conditions of caustic soda wherein the caustic soda concentration in the digester effluent was 190 grams per liter, 1.95 grams of $SiO_2$ were found per liter. On the other hand, for the dilute extraction conditions wherein 67 grams per liter caustic soda was found in the green liquor, only 0.31 gram per liter $SiO_2$ was found. Consequently, more than 80% less $SiO_2$ was found per liter under dilute conditions as compared to concentrated conditions. When considered on a basis of caustic soda content, the $SiO_2/C$ ratios for the concentrated and dilute green liquor were about .01 and .005 respectively. It is apparent therefore that about 50% less $SiO_2$ was found in solution per unit of caustic soda under the dilute extracting conditions as compared to the more concentrated conditions.

In general, the high degrees of aluminate solubility may be obtained under a wide variety of operating conditions as regards caustic soda concentration. For example, caustic soda concentrations in the pregnant phosphate containing caustic aluminate liquors from the digestion operation of from 50 to about 400 grams per liter have been found to produce said high A/C ratios. Nevertheless, optimum caustic soda concentrations for control of the silica solubilization are from about 50 to 200 grams per liter. For large scale plant operations, wherein good extractions of the components is desired and economic recoveries sodium phosphate and alumina hydrate are to be expected in the crystallization operations, caustic soda concentration of from 100 to 200 grams per liter are preferred.

That the selective crystallization of sodium phosphate from the alumina containing liquors may be facilitated by cooling the green liquors containing large amounts of $P_2O_5$ and $Al_2O_3$ is apparent from the material in Table II.

For the crystallization tests a phosphatic green liquor having the following analysis was employed:

| | |
|---|---|
| Caustic soda (g./l.) | 189.73 |
| $Al_2O_3$ (g./l.) | 138.86 |
| $P_2O_5$ (g./l.) | 35.37 |
| A/C | .732 |

| | Test 1 | Test 2 |
|---|---|---|
| Green Liquor Treatment: Cooled to (° C.) | 20 | 2.5 |
| Dephosphated Green Liquor: | | |
| Caustic soda concentration (g./l.) | 154.94 | 169.07 |
| $Al_2O_3$ (g./l.) | 208.38 | 227.01 |
| $P_2O_5$ (g./l.) | 2.30 | 0.97 |
| A/C | .744 | .745 |
| Percent $P_2O_5$ crystallized | 93.50 | 97.26 |

In Test 1, the liquor was cooled to 20° C. The sodium phosphate apparently crystallizes as $Na_3PO_4 \cdot 12H_2O$ causing a concentration of the solution as for example from about 190 to about 208 grams per liter. It is apparent that a substantial portion of the $P_2O_5$ content was thus removed. For example, 93.50%, in Test 1, of the $P_2O_5$ content was crystallized from the phosphate containing green liquor.

It is also apparent from an inspection of the material under Test 2 that greater yields of sodium phosphate may be expected for lower temperatures. For example, by lowering the temperature to 2.5° C., 97.26% of the $P_2O_5$ content was crystallized from the green liquor. In general, it has been found that temperatures between about $-10°$ C. and 20° C. are preferred for the greatest yields of sodium phosphate. For the lower temperatures, it has been found that shorter holding periods may be sufficient, the final determination, of course, depending on the economics and design of a plant for the herein described process.

It is apparent to those skilled in the Bayer art, that the dephosphated green liquors may be subsequently treated with lime, where lower $P_2O_5$ concentrations are desired so as not to excessively contaminate the final product, for the removal of the uncrystallized amounts of phosphate prior to the autoprecipitation of the alumina content of the green dephosphate liquors. For example, lime in about stoichiometric amounts, a slight excess being preferred for completeness of reaction, may be added to cause the formation of insoluble calcium phosphate which may be removed prior to the alumina hydrate recovery. About 3.2 mols of lime per mol of $P_2O_5$ is preferred for acceptable low conc. of $P_2O_5$. Generally however, by cooling to about 0° C., the amount of $P_2O_5$ remaining in solution will correspond to conventional Bayer plant practices.

The invention will be more fully understood by a consideration of the schematic flow diagram which shows the relationship of the more important operations in producing a reduction grade alumina according to one embodiment of the process herein described.

The raw aluminum phosphatic ores may be led to a beneficiation system 1 as through line 2 wherein the alumina and phosphate control of the ores to be processed are up graded by eliminating substantial amounts of silica and sand waste as through line 3. Beneficiation operations for eliminating large amounts of quartz and other undersirable minerals are well known, one method employing grinding and screening operations whereby the oversize waste material is separated from the valuable constituents. Beneficiation is not critical to the inventive scope but rather highly desirable for commercial operations and as another method of minimizing the silica problem but decreasing the amount of silicious material sent to the decomposers.

The up graded ore from beneficiation system 1 is then led, as by line 4 to digestion system 5 wherein it is combined with concentrated recycled spent liquor having an A/C ratio of .177 and caustic soda concentration of 175 grams per liter through line 6 from evaporation system 7. In digestion system 5 the ore is digested at 100° C. to obtain an A/C ratio of .70 in the pregnant liquors. The residue containing green liquors from digestion system 5 is led to clarification system 8 through line 9 wherein the mud residues are separated through line 10. Although not shown, the mud residues may, of course, be washed for the recovery of the valuable constituents associated with the muds.

From the clarification system 8 the clarified liquors are led to the sodium phosphate crystallizing system 11 through line 12 wherein the insoluble sodium phosphate formed by cooling the pregnant liquors to about 0° C. are removed as through line 13.

The dephosphated sodium aluminate liquors from the sodium phosphate crystallizing system 11 are then led to autoprecipitation system 14 through line 15 or alternatively to lime dephosphator 16 through line 17 where operations call for less solubilized phosphates in the pregnant liquor led to autoprecipitation system 14 than may economically be obtained by cooling in sodium phosphate crystallizing system 11. In general, however, cooling to 0° C. will dephosphate the liquors to a point acceptable in Bayer operations. In lime dephosphator 16 lime is added in an amount of about 3.2 mols of lime per mol of remaining $P_2O_5$ through line 18 to form insoluble calcium phosphate which is separated through line 19. The dephosphated pregnant caustic dominate liquor is then led to autoprecipitation system 14 through line 20.

The caustic aluminate liquors from sodium phosphate crystallizing system 11 or lime dephosphator 16 are then subjected to the conventional type of alumina hydrate recovery the operation which is well known to those skilled in the Bayer art. Thus, the pregnant liquors are mixed with recycled alumina hydrate seed particles as through line 21 and autoprecipitation allowed to proceed until the pregnant liquors have given up the recoverable hydrate which is removed through line 22 and the spent liquors of A/C ratio of about .311 removed through line 23. The hydrate particles are usually classified and the fine hydrate returned for use as seed through line 21 and the remaining particles calcined in calcination system 24, in known manners to produce a reduction grade alumina product as at 24. The spent liquors may be concentrated in evaporation system 7 and utilized with make up caustic soda 25 for further extraction purposes. Because of the soda values removed with the $P_2O_5$ content in sodium phosphate crystallizing system 11 appreciable amounts of make up caustic are added thus reducing the A/C ratio of the spent caustic aluminate liquors to about A/C=.18.

It is apparent from the foregoing material and flow diagram that a cyclic process for the recovery of both alumina and phosphates from aluminum phosphate containing ores has been devised characterized by the fact that greater quantities of alumina may be recovered per unit of caustic soda from the solubilizing reaction than heretofore experienced in conventional Bayer plant practice. Furthermore, by control of the digestion conditions the amount of losses as the result of the caustic attack on the silicious components of the ore may be minimized.

It should be noted that the invention is directed primarily to solubilizing the aluminum phosphate content of wavellite and pseudowavellite types of ores and is not to be construed as limited by methods for recovering the aluminate and phosphate content of the pregnant liquors except as brought out in the claimed subject matter because other methods for recovering the phosphate content of the liquors are known such as by crystallizing the solubilized $P_2O_5$ content entirely with lime subsequent to solubilization thereof. Furthermore, it is well known that the alumina content of caustic aluminate liquors may be recovered as by carbonation.

I claim:

1. In an alkaline process for recovering alumina values from ores containing said alumina values principally as aluminum phosphate and said ores also containing appreciable amounts of silicious material, the process of extracting the aluminum phosphate values from the ores without excessive losses of soda and alumina through the formation of insoluble sodium aluminum silicate complexes which comprises digesting said ores in spent caustic soda solutions to extract said aluminum phosphate at temperatures between about 80° C. and the atmospheric boiling point of said solutions, limiting contact of said ores with said caustic soda solutions at the digestion temperatures to a period of time not greater than 30 minutes, and thereafter separating the residues from the pregnant solutions containing the solubilized alumina and phosphate values.

2. The process according to claim 1 wherein the ores are maintained in contact with the caustic solutions at temperatures between 80° C. and the atmospheric boiling point thereof for a period of time less than 1 hour prior, and thereafter immediately separating the residues from the pregnant solutions containing the solubilized alumina and phosphate values.

3. In an alkaline process for recovering alumina values from ores containing said alumina values principally as aluminum phosphate and said ores also contain appreciable amounts of silicious material, the process of extracting the aluminum phosphate values from the ores without excessive losses of soda and alumina through the formation of insoluble sodium aluminum silicate complexes which comprises digesting said ores in spent caustic soda-containing liquor to extract the aluminum phosphate at temperatures between about 80° C. and the atmospheric boiling point thereof for a period of time not greater than about 1 hour, cooling said solution to a temperature not greater than 70° C., wherein the rate of solubilization of silica in the caustic solutions is not appreciable and thereafter clarifying the solution of the insoluble ore residues.

4. The process according to claim 3 wherein the ores are digested for a period not greater than 30 minutes prior to cooling and clarifying.

5. In an alkaline process for recovering aluminous values from ore containing said values principally as aluminum phosphate and containing appreciable amounts of siliceous material wherein said values together with phosphate values are dissolved in spent caustic soda-containing liquor and subsequently recovered from the green caustic liquor produced thereby, the method for solubilizing said aluminous and phosphate values in said spent liquor and minimizing the losses of alumina and caustic values as insoluble sodium aluminum silicate complexes comprising charging said ore to said spent liquor in amounts sufficient to provide an alumina to caustic soda ratio in said green liquor in excess of about .62 and digesting said ore in said spent liquor at temperatures from about 80° C. to the atmospheric boiling point of the solution.

6. In an alkaline process for recovering alumina values from ores containing said alumina values principally as aluminum phosphate and said ores also containing appreciable amounts of siliceous material, the process of extracting the aluminum phosphate values from the ores without excessive losses of soda and alumina through the formation of insoluble sodium silicate complexes which comprises digesting the ores with spent caustic soda-containing liquors to extract the aluminum phosphate content of said ores at temperatures of between about 80° C. and the atmospheric boiling point of said caustic solutions for a period of time not greater than about 1 hour and allowing clarification to proceed by decantation at the same time extraction of the auminum phosphate of the ores is proceeding.

7. In an alkaline process for recovering aluminous values from ore containing said values principally as aluminum phosphate and containing appreciable amounts of siliceous material wherein said values together with phosphate values are dissolved in spent caustic soda-containing liquor and subsequently recovered therefrom, the method for solubilizing said aluminous and phosphate values in said spent liquor and minimizing the losses of alumina and caustic values as insoluble sodium aluminum silicate complexes comprising charging said ore to said spent liquor in amounts sufficient to provide an alumina to caustic soda ratio in said liquor in excess of about .62 ad digesting said ore in said spent liquor a temperature of from about 80° C. to about the atmospheric boiling point thereof under caustic soda conditions productive of a concentration of caustic soda of from about 50 to 200 grams per liter after solubilization of said values therein.

8. In an alkaline process for recovering alumina values from ores containing said alumina values principally as aluminum phosphate and said ores also containing appreciable amounts of siliceous material, the process of solubilizing said aluminum phosphate values without excessive losses of alumina and soda by the formation of insoluble sodium aluminum complexes which comprises digesting said ores in spent caustic soda-containing solutions at temperatures between about 80° C. and the atmospheric boiling point of the solution, said solution having a caustic soda concentration after said solubilizing reaction of from about 50 to 200 grams per liter for a period of time less than about 30 minutes followed by clarification of the insoluble residues from the pregnant liquors.

9. In an alkaline process for recovering alumina values from ores containing said alumina values principally as aluminum phosphate and said ores also contain appreciable amounts of siliceous material, the process of solubilizing said aluminum phosphate values without excessive losses of alumina and soda by the formation of insoluble sodium aluminum silicate complexes which comprises digesting said ores in spent caustic soda-containing solutions having a caustic soda concentration after said solubilizing reaction of about 50 to 200 grams per liter at temperatures between about 80° C. and the atmospheric boiling point of said solution for a period of time less than about 60 minutes followed by immediate clarification of the inosluble residues from the pregnant liquor.

References Cited in the file of this patent

UNITED STATES PATENTS

| 1,747,759 | Dorr et al. | Feb. 18, 1930 |
| 1,845,876 | Huber | Feb. 16, 1932 |
| 2,559,653 | Mooney | July 10, 1951 |

FOREIGN PATENTS

| 14,657 | Great Britain | June 10, 1893 |

(Other references on following page)

OTHER REFERENCES

"Alumina from Low-Grade Bauxite," Chemical Trade Journal and Chemical Engineer; British publication, pages 60 and 61.

Tiemann: "Extraction of Alumina from Haiti and Jamaica Bauxites," in "Journal of Metals," May 1951, vol. 3, pages 389 to 393.

Sherwin: "Extractive Metallurgy of Aluminum," in "Journal of Metals," April 1950, vol. 188, No. 4, pages 661 to 667.

UNITED STATES PATENT OFFICE
CERTIFICATE OF CORRECTION

Patent No. 2,843,456             July 15, 1958

John L. Porter

It is hereby certified that error appears in the printed specification of the above numbered patent requiring correction and that the said Letters Patent should read as corrected below.

Column 3, line 56, for "silicous" read -- silicious --; column 4, lines 32 and 33, for "caustice" read -- caustic --; column 12, line 31, for "ad" read -- and --; same line 31, after "liquor" insert -- at --.

Signed and sealed this 4th day of April 1961.

(SEAL)
Attest:    ERNEST W. SWIDER

X̶X̶X̶X̶X̶X̶X̶X̶X̶X̶
Attesting Officer

ARTHUR W. CROCKER
Acting Commissioner of Patents